United States Patent
Kawano et al.

(10) Patent No.: US 8,505,321 B2
(45) Date of Patent: Aug. 13, 2013

(54) REFRIGERATION APPARATUS WITH REDUCED CONSTRAINTS ON PLACEMENT OF UTILIZATION UNIT RELATIVE TO HEAT SOURCE UNIT

(75) Inventors: Satoshi Kawano, Osaka (JP); Shinya Matsuoka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 1003 days.

(21) Appl. No.: 12/525,208

(22) PCT Filed: Jan. 16, 2008

(86) PCT No.: PCT/JP2008/050418
§ 371 (c)(1),
(2), (4) Date: Jul. 30, 2009

(87) PCT Pub. No.: WO2008/093538
PCT Pub. Date: Aug. 7, 2008

(65) Prior Publication Data
US 2010/0024454 A1 Feb. 4, 2010

(30) Foreign Application Priority Data
Jan. 31, 2007 (JP) ................................. 2007-020413

(51) Int. Cl.
*F25B 41/04* (2006.01)
(52) U.S. Cl.
USPC ................... 62/222; 62/204; 62/205; 62/216; 62/217
(58) Field of Classification Search
USPC ............................. 62/204, 205, 216, 217, 222
See application file for complete search history.

(56) References Cited

U.S. PATENT DOCUMENTS

| | | | | |
|---|---|---|---|---|
| 5,142,877 A | * | 9/1992 | Shimizu | 62/129 |
| 6,826,924 B2 | * | 12/2004 | Shimoda et al. | 62/324.4 |
| 2003/0230102 A1 | | 12/2003 | Hong | |
| 2006/0107683 A1 | * | 5/2006 | Song et al. | 62/324.1 |
| 2006/0123809 A1 | * | 6/2006 | Ha et al. | 62/149 |

FOREIGN PATENT DOCUMENTS

| | | |
|---|---|---|
| JP | 62-129660 A | 6/1987 |
| JP | 2-306046 A | 12/1990 |
| JP | 04-116347 A | 4/1992 |
| JP | 05-306849 A | 11/1993 |
| JP | 8-189717 A | 7/1996 |

(Continued)

OTHER PUBLICATIONS

JP 08-189717 (English Translation).*

*Primary Examiner* — Marc Norman
*Assistant Examiner* — Jonathan Bradford
(74) *Attorney, Agent, or Firm* — Birch, Stewart, Kolasch & Birch, LLP.

(57) ABSTRACT

For cooling operation, a refrigeration apparatus includes a heat-source-side valve opening controller for controlling a degree of opening of a heat-source-side expansion valve so that pressure of a refrigerant flowing into the utilization-side expansion valve in the cooling operation becomes equal to or lower than a predetermined reference pressure value. For heating operation, the refrigeration apparatus includes a utilization-side valve opening controller for performing, when a low-quantity utilization unit in which a quantity of the refrigerant falls below a quantity of the refrigerant required for delivering capacity of the utilization unit is found among a plurality of the utilization units in the heating operation, valve opening reducing operation of reducing a degree of opening of the utilization-side expansion valve of the utilization unit except for the low-quantity utilization unit.

10 Claims, 4 Drawing Sheets

(56) References Cited

FOREIGN PATENT DOCUMENTS

| | | | |
|---|---|---|---|
| JP | 10-300255 A | 11/1998 | |
| JP | 2002-147878 A | 5/2002 | |
| JP | 2003-56933 A | 2/2003 | |
| JP | 2004-20189 A | 1/2004 | |
| JP | 2004-226016 A | 8/2004 | |
| JP | 2005-121310 A | 5/2005 | |

* cited by examiner

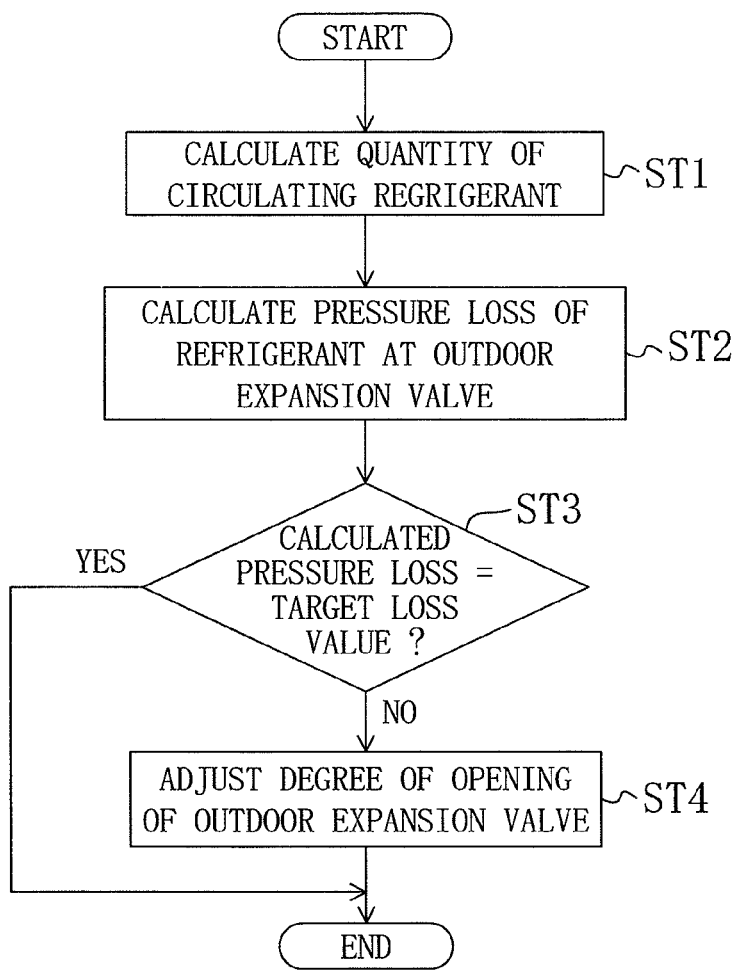

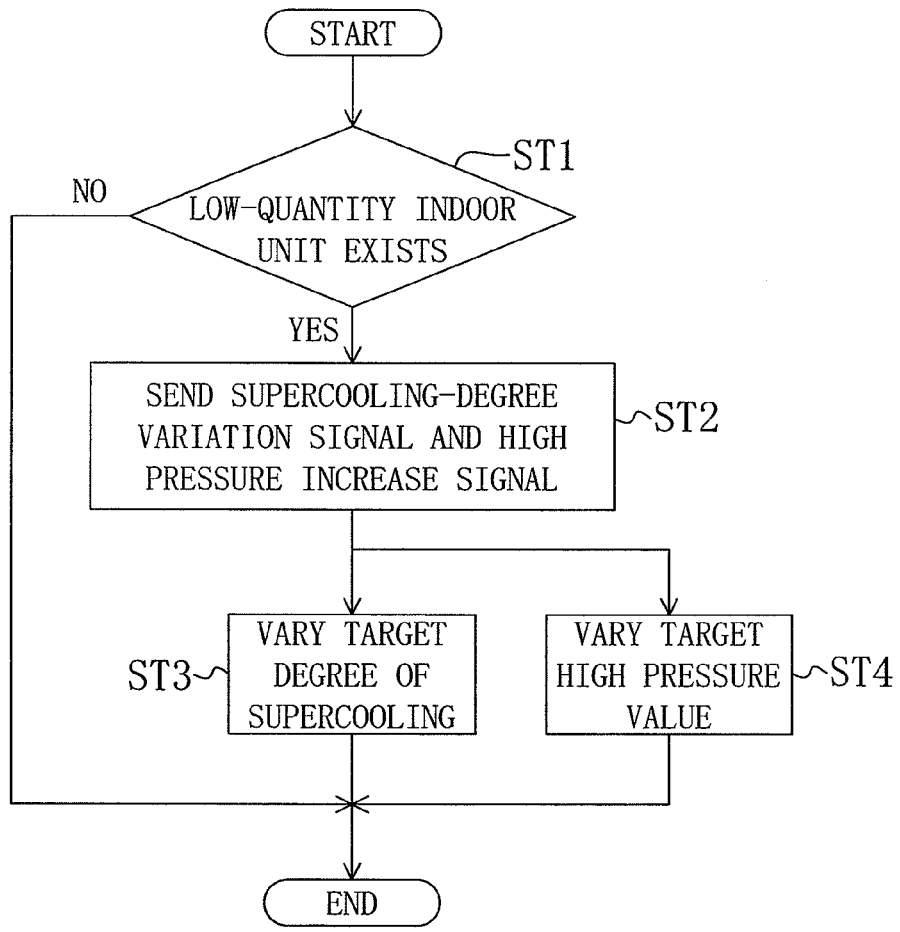
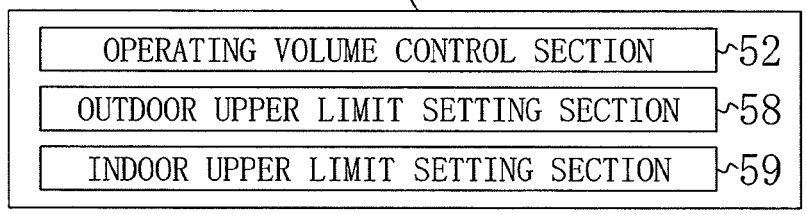

REFRIGERATION APPARATUS WITH REDUCED CONSTRAINTS ON PLACEMENT OF UTILIZATION UNIT RELATIVE TO HEAT SOURCE UNIT

TECHNICAL FIELD

The present invention relates to a refrigeration apparatus including a heat source unit and a utilization unit.

BACKGROUND ART

Refrigeration apparatuses including a heat source unit and a utilization unit have conventionally been known. The heat source unit and the utilization unit are connected through connecting pipes. Patent Document 1 discloses an example of the refrigeration apparatus of this type.

Specifically, Patent Document 1 discloses an air conditioner including an outdoor unit, a first indoor unit, and a second indoor unit. In this air conditioner, the outdoor unit is placed on a roof of a building, the first indoor unit is placed at a level lower than the outdoor unit, and the second indoor unit is placed at a level lower than the first indoor unit. The outdoor unit includes an outdoor circuit, and each of the indoor units includes an indoor unit. The indoor circuits are connected in parallel to the outdoor circuit through a liquid connecting pipe and a gas connecting pipe. The outdoor unit includes a compressor, an outdoor heat exchanger, an outdoor expansion valve, a receiver, etc. Each of the indoor circuits includes an indoor expansion valve and an indoor heat exchanger.

Patent Document 1: Published Japanese Patent Publication No. 2002-147878

DISCLOSURE OF THE INVENTION

Problem that the Invention is to Solve

In the refrigeration apparatus of this kind, there are some cases where the utilization unit cannot be placed relative to the heat source unit due to constraints, such as a difference in height between a placement position of the heat source unit and a placement position of the utilization unit, a length of the pipe connecting the heat source unit and the utilization unit, etc. That is, in some cases, the utilization unit cannot be placed due to the constraints imposed by the placement conditions.

For example, when there is a relatively large height difference between the placement position of the heat source unit and the placement position of the utilization unit, height of a head of a liquid refrigerant in the liquid connecting pipe increases, and pressure of the liquid refrigerant exerted on a liquid end of the utilization circuit by the height of the head becomes large (hereinafter referred to as liquid head pressure).

In a refrigeration apparatus for performing cooling operation, the liquid head pressure is exerted on an inlet of the utilization circuit through which a high pressure refrigerant flows. Therefore, when the height difference between the placement position of the heat source unit and the placement position of the utilization unit is larger, the pressure exerted on a utilization-side expansion valve arranged at the inlet of the utilization circuit becomes higher. In view of this, in the refrigeration apparatus for performing the cooling operation, an upper limit value is established for the height difference between the placement position of the heat source unit and the placement position of the utilization unit so as to prevent excessive increase of the pressure exerted on the utilization-side expansion valve, and to avoid break of the utilization-side expansion valve.

Further, in a refrigeration apparatus for performing heating operation, the liquid head pressure is exerted on an outlet of the utilization circuit. Therefore, when the height difference between the placement position of the heat source unit and the placement position of the utilization unit is relatively larger, a difference between pressure at the inlet and pressure at the outlet of the utilization circuit becomes smaller. With the difference between the inlet pressure and the outlet pressure of the utilization circuit reduced, and when there are multiple utilization circuits, a quantity of the refrigerant may become insufficient in the utilization unit into which the refrigerant is relatively less likely to flow due to its placement conditions. As a result, the utilization unit may fail to sufficiently deliver its capacity. The utilization unit into which the refrigerant is relatively less likely to flow due to its placement conditions may be, for example, a utilization unit placed at a lower level and receives a large liquid head pressure, and a utilization unit connected to the heat source unit through a long pipe, which increases pressure loss.

Thus, in the refrigeration apparatus for performing the heating operation, an upper limit value is established for the height difference between the placement position of the heat source unit and the placement position of the utilization unit so that none of the utilization units fails to deliver the capacity.

In view of the foregoing point, the present invention was developed. The present invention is directed to the refrigeration apparatus including the heat source unit and the utilization unit, and aims to reduce the constraints imposed by the placement conditions on how the utilization unit is placed.

Means of Solving the Problem

A first aspect of the invention is directed to a refrigeration apparatus (20) including: a heat source unit (64) having a heat source circuit (14) connecting a compressor (26), a heat-source-side heat exchanger (44), and a heat-source-side expansion valve (36); and a utilization unit (61) having a utilization circuit (11) connecting a utilization-side heat exchanger (41) and a utilization-side expansion valve (51), and being placed at a level lower than the heat source unit (64), the heat source circuit (14) and the utilization circuit (11) being connected to provide a refrigerant circuit (10) for performing cooling operation by circulating a refrigerant so that the heat-source-side heat exchanger (44) functions as a condenser, and the utilization-side heat exchanger (41) functions as an evaporator, and the utilization-side heat exchanger (41) functions as an evaporator. In the refrigeration apparatus (20), the heat-source-side expansion valve (36) and the utilization-side expansion valve (51) in the refrigerant circuit (10) are connected through a liquid connecting pipe (15), and a heat-source-side valve opening control means (53) is provided for controlling a degree of opening of the heat-source-side expansion valve (36) so that pressure of the refrigerant flowing into the utilization-side expansion valve (51) in the cooling operation becomes equal to or lower than a predetermined reference pressure value.

According to a second aspect of the invention related to the first aspect of the invention, the heat-source-side valve opening control means (53) controls the degree of opening of the heat-source-side expansion valve (36) in the cooling operation so that the pressure of the refrigerant flowing into the utilization-side expansion valve (51) becomes equal to or lower than the predetermined reference pressure value, using a target control value for the cooling operation determined based on a height difference between a placement position of the heat source unit (64) and a placement position of the utilization unit (61).

According to a third aspect of the invention related to the second aspect of the invention, the heat-source-side valve opening control means (53) controls the degree of opening of the heat-source-side expansion valve (36) in the cooling operation so that pressure loss of the refrigerant at the heat-source-side expansion valve (36) is kept to a target loss value determined as a target control value of the pressure loss in the cooling operation.

According to a fourth aspect of the invention related to the second or third aspect of the invention, multiple ones of the utilization unit (61) are provided, and are connected in parallel to the heat source unit (64), and the target control value for the cooling operation is determined based on a height difference between the placement position of the heat source unit (64) and a placement position of one of the utilization units (61) placed at the lowest level.

According to a fifth aspect of the invention related to the fourth aspect of the invention, the refrigeration apparatus is configured to selectively perform the cooling operation and heating operation of circulating the refrigerant so that the heat-source-side heat exchanger (44) functions as an evaporator, and the utilization-side heat exchangers (41) function as condensers in the refrigerant circuit (10), and a utilization-side valve opening control means (38, 54) is provided for performing, when a low-quantity utilization unit (61) in which a quantity of the refrigerant falls below a quantity of the refrigerant required for delivering capacity of the utilization unit (61) is found among the multiple ones of the utilization unit (61) in the heating operation, valve opening reducing operation of reducing a degree of opening of the utilization-side expansion valve (51) of the utilization unit (61) except for the low-quantity utilization unit (61).

A sixth aspect of the invention is directed to a refrigeration apparatus (20) including: a heat source unit (64) having a heat source circuit (14) connecting a compressor (26) and a heat-source-side heat exchanger (44); and a plurality of utilization units (61), each of which having a utilization circuit (11) connecting a utilization-side heat exchanger (41) and a utilization-side expansion valve (51), the plurality of utilization circuits (11) being connected in parallel to the heat source circuit (14) to provide a refrigerant circuit (10) for performing heating operation by circulating a refrigerant so that the heat-source-side heat exchanger (44) functions as an evaporator, and the utilization-side heat exchangers (41) function as condensers. In the refrigeration apparatus (20), a utilization-side valve opening control means (38, 54) is provided for performing, when a low-quantity utilization unit (61) in which a quantity of the refrigerant falls below a quantity of the refrigerant required for delivering capacity of the utilization unit (61) is found among the plurality of the utilization units (61) in the heating operation, valve opening reducing operation of reducing a degree of opening of the utilization-side expansion valve (51) of the utilization unit (61) except for the low-quantity utilization unit (61).

According to a seventh aspect of the invention related to the fifth or sixth aspect of the invention, the utilization-side valve opening control means (38, 54) in the heating operation judges the utilization unit (61) in which the degree of opening of the utilization-side expansion valve (51) is equal to or higher than a predetermined value as the low-quantity utilization unit (61).

According to an eighth aspect of the invention related to any one of the fifth to seventh aspects of the invention, the refrigeration apparatus (20) further includes: an operating volume control means (52) for increasing an operating volume of the compressor (26) when the utilization-side valve opening control means (38, 54) performs the valve opening reducing operation in the heating operation.

According to a ninth aspect of the invention related to any one of the fifth to eighth aspects of the invention, in the heating operation, the utilization-side valve opening control means (38, 54) controls the degree of opening of the utilization-side expansion valve (51) of each of the utilization units (61) so that a degree of subcooling of the refrigerant discharged from each of the utilization-side heat exchangers (41) becomes equal to a target degree of subcooling, and the utilization-side valve opening control means (38, 54) varies the target degree of subcooling of the utilization unit (61) for which the valve opening reducing operation is performed to a larger value in the valve opening reducing operation. operation.

A tenth aspect of the invention is directed to a refrigeration apparatus (20) including: a heat source unit (64) having a heat source circuit (14) connecting a compressor (26), a heat-source-side heat exchanger (44), and a heat-source-side expansion valve (36); and a utilization unit (61) having a utilization circuit (11) connecting a utilization-side heat exchanger (41) and a utilization-side expansion valve (51), and being placed at a level lower than the heat source unit (64), the heat source circuit (14) and the utilization circuit (11) being connected to provide a refrigerant circuit (10) for performing cooling operation by circulating a refrigerant so that the heat-source-side heat exchanger (44) functions as a condenser, and the utilization-side heat exchanger (41) functions as an evaporator. In the refrigeration apparatus (20), the heat-source-side expansion valve (36) and the utilization-side expansion valve (51) in the refrigerant circuit (10) are connected through a liquid connecting pipe (15), and a heat-source-side upper limit setting means (58) is provided for setting an upper limit value of a degree of opening of the heat-source-side expansion valve (36) in the cooling operation based on a height difference between a placement position of the heat source unit (64) and a placement position of the utilization unit (61).

According to an eleventh aspect of the invention related to the tenth aspect of the invention, multiple ones of the utilization unit (61) are provided, and are connected in parallel to the heat source unit (64), and the heat-source-side upper limit setting means (58) sets an upper limit value of the degree of opening of the heat-source-side expansion valve (36) in the cooling operation based on a height difference between the placement position of the heat source unit (64) and a placement position of one of the utilization units (61) placed at the lowest level.

According to a twelfth aspect of the invention related to the eleventh aspect of the invention, the refrigeration apparatus is configured to selectively perform the cooling operation and heating operation of circulating the refrigerant so that the heat-source-side heat exchanger (44) functions as an evaporator, and the utilization-side heat exchangers (41) function as condensers in the refrigerant circuit (10), and a utilization-side upper limit setting means (59) is provided for setting an upper limit value of the degree of opening of the utilization-side expansion valve (51) in the heating operation for the utilization unit (61) except for the utilization unit (61) into which the refrigerant is relatively less likely to flow due to its placement conditions.

A thirteenth aspect of the invention is directed to a refrigeration apparatus (20) including: a heat source unit (64) having a heat source circuit (14) connecting a compressor (26), a heat-source-side heat exchanger (44), and a heat-source-side expansion valve (36); and a plurality of utilization units (61), each of which having a utilization circuit (11) connecting a utilization-side heat exchanger (41) and a utilization-side expansion valve (51), the plurality of utilization circuits (11) being connected in parallel to the heat source circuit (14) to provide a refrigerant circuit (10) for performing heating operation by circulating a refrigerant so that the heat-source-side heat exchanger (44) functions as an evaporator, and the utilization-side heat exchangers (41) function as condensers. In the refrigeration apparatus (20), a utilization-side upper limit setting means (59) is provided for setting an upper limit value of a degree of opening of the utilization-side expansion valve (51) in the heating operation for the utilization unit (61) except for the utilization unit (61) into which the refrigerant is relatively less likely to flow due to its placement conditions.

Advantages

According to the first aspect of the invention, the degree of opening of the heat-source-side expansion valve (36) is controlled so that the pressure of the refrigerant flowing into the utilization-side expansion valve (51) in the cooling operation becomes equal to or lower than the predetermined reference pressure value. For example, when there is a relatively large height difference between the placement position of the heat source unit (64) and the placement position of the utilization unit (61), the liquid head pressure in the pressure of the refrigerant flowing into the utilization-side expansion valve (51) increases. In this case, as compared with the case where the height difference is small, the pressure of the refrigerant exerted on the utilization-side expansion valve (51) is more likely to increase, and the risk of break of the utilization-side expansion valve (51) increases. To cope with this, according to the first aspect of the invention, for example, when the pressure of the refrigerant flowing into the utilization-side expansion valve (51) approaches the predetermined reference pressure value, the degree of opening of the heat-source-side expansion valve (36) is reduced so that the pressure does not exceed the predetermined reference value, thereby increasing the pressure loss of the refrigerant at the heat-source-side expansion valve (36). Namely, according to the first aspect of the invention, when the height difference is large, the degree of opening of the heat-source-side expansion valve (36) is adjusted to adjust the pressure exerted on the utilization-side expansion valve (51), so that the refrigeration apparatus can cope with the state where the pressure exerted on the utilization-side expansion valve (51) increases in the cooling operation.

According to the second aspect of the invention, the target control value for the cooling operation is determined based on the height difference between the placement position of the heat source unit (64) and the placement position of the utilization unit (61) (hereinafter referred to as an placement height difference). That is, since the magnitude of the liquid head pressure exerted on the liquid end of the utilization circuit (11) of the utilization unit (61) is obtained from the placement height difference, the target control value for the cooling operation can be determined based on the magnitude of the liquid head pressure. Then, the degree of opening of the heat-source-side expansion valve (36) in the cooling operation is adjusted using the target control value.

According to the third aspect of the invention, the degree of opening of the heat-source-side expansion valve (36) is adjusted so that the pressure loss of the refrigerant at the heat-source-side expansion valve (36) is kept to the target loss value. When the pressure loss of the refrigerant at the heat-source-side expansion valve (36) is large, the pressure of the refrigerant flowing into the utilization-side expansion valve (51) is reduced, which is preferable in view of protection of the utilization-side expansion valve (51). However, when the pressure loss is large, the quantity of the circulating refrigerant is reduced, and the capacity and efficiency of the refrigeration apparatus (20) are reduced. According to the third aspect of the invention, for protecting the indoor expansion valve (51), the pressure loss of the refrigerant at the outdoor expansion valve (36) is kept to the target loss value, so that the pressure loss of the refrigerant at the outdoor expansion valve (36) is not increased more than required.

According to the fourth aspect of the invention, the target control value for the cooling operation is determined based on the height difference between the placement position of the heat source unit (64) and the placement position of the utilization unit (61) placed at the lowest level. That is, the target control value for the cooling operation is determined based on the height difference between the utilization unit (61) placed at the lowest level, on which the highest liquid head pressure is exerted, and the heat source unit (64).

According to the fifth and sixth aspects of the invention, the utilization-side valve opening control means (38, 54) performs the valve opening reducing operation when the low-quantity utilization unit (61) in which the quantity of the refrigerant falls below the quantity of the refrigerant required for delivering capacity of the utilization unit (61) is found among the multiple ones of the utilization unit (61) in the heating operation. In the valve opening reducing operation, the utilization-side valve opening control means (38, 54) reduces the degree of opening of the utilization-side expansion valve (51) of the utilization unit (61) except for the low-quantity utilization unit (61).

For example, when there is a relatively large height difference between the placement position of the utilization unit (61) placed at the lowest level and the placement position of the heat source unit (64), as described above, the quantity of the refrigerant may become insufficient in the utilization unit (61) into which the refrigerant is relatively less likely to flow due to its placement conditions, and the utilization unit (61) into which the refrigerant is relatively less likely to flow due to its placement conditions may become the low-quantity utilization unit. Even when the height difference between the placement position of the utilization unit (61) and the placement position of the heat source unit (64) is not so large, or even when the utilization unit (61) and the heat source unit (64) are placed at the same level, and if one of the utilization units (61) is connected to the heat source unit (64) through a considerably long pipe as compared with the other utilization unit (61), the quantity of the refrigerant may lack in the utilization unit (61), and the utilization unit (61) may become the low-quantity utilization unit.

To cope with this, according to the fifth and sixth aspects of the invention, the valve opening reducing operation is performed to reduce the degree of opening of the utilization-side expansion valve (51) of the utilization unit (61) except for the low-quantity utilization unit (61). As a result of the valve opening reducing operation, the refrigerant becomes less likely to flow into the utilization unit (61) for which the valve opening reducing operation is performed, and therefore, the refrigerant is more likely to flow into the low-quantity utilization unit (61).

According to the seventh aspect of the invention, in the heating operation, the utilization-side valve opening control means (38, 54) judges the utilization unit (61) in which the degree of opening of the utilization-side expansion valve (51) is equal to or higher than the predetermined value as the low-quantity utilization unit. The utilization-side valve opening control means (38, 54) performs the valve opening reducing operation when the low-quantity utilization unit in which the degree of opening of the utilization-side expansion valve (51) exceeds the predetermined value is found among the plurality of the utilization units (61) in the heating operation.

According to the eighth aspect of the invention, the operating volume control means (52) increases the operating volume of the compressor (26) when the utilization-side valve opening control means (38, 54) performs the valve opening reducing operation in the heating operation. When the operating volume of the compressor (26) increases, the quantity of the refrigerant circulating in the refrigerant circuit (10) increases. Then, the quantity of the refrigerant distributed to each of the utilization units (61) is also increased. This can suppress the reduction in quantity of the refrigerant in the utilization unit (61) for which the valve opening reducing operation is performed, and can maintain the quantity of the refrigerant in the low-quantity utilization unit (61).

According to the ninth aspect of the invention, the target degree of subcooling of the utilization unit (61) for which the valve opening reducing operation is performed is varied to a larger value. Since the degree of subcooling of the refrigerant discharged from the utilization-side heat exchanger (41) is controlled to be equal to the varied target degree of subcooling, the degree of opening of the utilization-side expansion valve (51) of the utilization unit (61) for which the valve opening reducing operation is performed is reduced.

According to the tenth aspect of the invention, the heat-source-side upper limit setting means (58) sets the upper limit value of the degree of opening of the heat-source-side expansion valve (36) in the cooling operation. The upper limit value of the degree of opening of the heat-source-side expansion valve (36) is set based on the height difference between the placement position of the heat source unit (64) and the placement position of the utilization unit (61). That is, the upper limit value of the degree of opening of the heat-source-side expansion valve (36) is set based on the magnitude of the liquid head pressure exerted on the utilization-side expansion valve (51) of the utilization unit (61).

According to the eleventh aspect of the invention, the upper limit value of the degree of opening of the heat-source-side expansion valve (36) in the cooling operation is set based on the height difference between the placement position of the heat source unit (64) and the placement position of the utilization unit (61) placed at the lowest level. That is, the upper limit value of the degree of opening of the heat-source-side expansion valve (36) in the cooling operation is set based on the height difference between the utilization unit (61) and the heat source unit (64), with which the liquid head pressure is maximized.

According to the twelfth and thirteenth aspects of the invention, the upper limit value of the degree of opening of the utilization-side expansion valve (51) in the heating operation is set for the utilization unit (61) except for the utilization unit (61) into which the refrigerant is relatively less likely to flow due to its placement conditions.

For example, when there is a relatively large height difference between the placement position of the utilization unit (61) placed at the lowest level and the placement position of the heat source unit (64), as described above, among the plurality of the utilization units (61), the utilization unit (61) placed at a lower level on which a larger liquid head pressure is exerted, and the utilization unit (61) connected to the heat source unit (64) through a long pipe which increases the pressure loss may become the utilization unit (61) into which the refrigerant is relatively less likely to flow due to its placement conditions. Even when the height difference between the placement position of the utilization unit (61) and the placement position between the heat source unit (64) is not so large, or even when the utilization unit (61) and the heat source unit (64) are placed at the same level, and if one of the utilization units (61) is connected to the heat source unit (64) through a considerably long pipe as compared with the other utilization unit (61), it may become the utilization unit (61) into which the refrigerant is relatively less likely to flow due to its placement conditions.

According to the twelfth and thirteenth aspects of the invention, the upper limit value of the degree of opening of the utilization-side expansion valve (51) in the heating operation is established for the utilization unit (61) except for the utilization unit (61) into which the refrigerant is relatively less likely to flow due to its placement conditions. That is, the degree of opening of the utilization-side expansion valve (51) in the utilization unit (61) except for the utilization unit (61) into which the refrigerant is relatively less likely to flow due to its placement conditions is limited to be equal to or lower than the predetermined value, which is smaller than the degree of opening of the fully opened valve. Thus, the refrigerant is less likely to flow into the utilization unit (61) for which the upper limit value is established, and therefore, the refrigerant is more likely to flow into the utilization unit (61) into which the refrigerant is relatively less likely to flow due to its placement conditions.

EFFECT OF THE INVENTION

According to the first to fifth aspects of the invention, the degree of opening of the heat-source-side expansion valve (36) is adjusted to adjust the pressure exerted on the utilization-side expansion valve (51), so that the refrigeration apparatus can cope with the state where the pressure exerted on the utilization-side expansion valve (51) increases in the cooling operation when the height difference between the placement position of the heat source unit (64) and the placement position of the utilization unit (61) is large. This structure makes it possible to increase the liquid head pressure as compared with a conventional refrigeration apparatus which cannot adjust the pressure exerted on the utilization-side expansion valve (51) in response to the height difference. Therefore, the height difference between the placement position of the heat source unit (64) and the placement position of the utilization unit (61) can be increased as compared with the conventional apparatus. This can reduce the constraints imposed by the placement conditions on how the utilization unit (61) is placed.

According to the second aspect of the invention, the magnitude of the liquid head pressure exerted on the liquid end of the utilization circuit (11) of the utilization unit (61) in the cooling operation is judged from the placement height difference, and the target control value for the cooling operation is set based on the magnitude of the liquid head pressure to control the degree of opening of the heat-source-side expansion valve (36). Specifically, a judgment is made from the placement height difference as to whether or not the pressure of the refrigerant flowing through the utilization-side expansion valve (51) of the utilization unit (61) will be as high as it may break the utilization-side expansion valve (51). Therefore, even if the utilization unit (61) is not provided with a pressure sensor for detecting the pressure of the refrigerant flowing through the utilization-side expansion valve (51) of the utilization unit (61), the pressure of the refrigerant exerted on the utilization-side expansion valve (51) can be kept equal to or lower than the predetermined reference pressure value. Thus, the structure of the refrigeration apparatus (20) can be simplified.

According to the third aspect of the invention, for protecting the utilization-side expansion valve (51), the pressure loss of the refrigerant at the heat-source-side expansion valve (36) is kept to the target loss value, so that the pressure loss of the refrigerant at the heat-source-side expansion valve (36) is not increased more than required. This makes it possible to protect the utilization-side expansion valve (51) with reliability, and to prevent waste of the capacity and efficiency of the refrigeration apparatus (20).

According to the fifth to ninth aspects of the invention, the valve opening reducing operation is performed when the low-quantity utilization unit (61) is found among the plurality of the utilization units (61) in the heating operation. Then, the refrigerant is less likely to flow into the utilization units (61) for which the valve opening reducing operation is performed, and therefore, the refrigerant is more likely to flow into the low-quantity utilization unit (61).

Therefore, for example, even when the height difference between the placement position of the utilization unit (61) placed at the lowest level and the placement position of the heat source unit (64) is relatively large, the lack of the refrigerant in the utilization unit (61) into which the refrigerant is relatively less likely to flow due to its placement conditions can be prevented. Thus, the height difference between the placement position of the heat source unit (64) and the placement position of the utilization unit (61) can be enlarged as compared with the conventional refrigeration apparatus which cannot adjust the ease of flow of the refrigerant into the utilization unit (61) into which the refrigerant is relatively less likely to flow due to its placement conditions.

Even when the height difference between the placement position of the utilization unit (61) and the placement position of the heat source unit (64) is not so large, or even when the utilization unit (61) and the heat source unit (64) are placed at the same level, and if one of the utilization units (61) is connected to the heat source unit (64) through a considerably long pipe as compared with the other utilization unit (61), the lack of the refrigerant in the utilization unit (61) connected through the long pipe can be prevented. Thus, the length of the pipe connecting the heat source unit (64) to the utilization unit (61) can be increased as compared with the conventional refrigeration apparatus which cannot adjust the ease of flow of the refrigerant into utilization unit (61) connected through the long pipe.

The above-described structure can reduce the constraints imposed by the placement conditions on how the utilization unit (61) is placed.

According to the eighth aspect of the invention, the operating volume of the compressor (26) increases in the heating operation when the valve opening reducing operation is performed, so as to prevent the reduction in quantity of the refrigerant in the utilization unit (61) for which the valve opening reducing operation is performed, and to maintain the quantity of the refrigerant in the low-quantity utilization unit (61). This can facilitate keeping a sufficient quantity of the refrigerant in each of the utilization units (61), and facilitate delivering a sufficient capacity of each of the utilization units (61).

According to the tenth to twelfth aspects of the invention, the upper limit value of the degree of opening of the heat-source-side expansion valve (36) is set based on the magnitude of the liquid head pressure exerted on the utilization-side expansion valve (51) of the utilization unit (61). For example, even when the heat-source-side expansion valve (36) is fully opened in the cooling operation, the conventional refrigeration apparatus, which cannot adjust the upper limit value of the degree of opening of the heat-source-side expansion valve (36) based on the magnitude of the liquid head pressure, sets the upper limit value for the height difference between the placement position of the heat source unit (64) and the placement position of the utilization unit (61) so as to prevent excessive increase in the pressure of the refrigerant flowing into the utilization-side expansion valve (51), and to avoid break of the utilization-side expansion valve (51). According to the tenth to twelfth aspects of the invention, on the other hand, the upper limit value is set for the height difference between the placement position of the heat source unit (64) and the placement position of the utilization unit (61) to cope with the state where the degree of the opening of the heat-source-side expansion valve (36) reaches the upper limit value in the cooling operation, i.e., the state where the pressure loss of the refrigerant at the heat-source-side expansion valve (36) is greater than that in the conventional case. As compared with the conventional case, this makes it possible to increase the liquid head pressure, and allows for the increase of the height difference between the placement position of the heat source unit (64) and the placement position of the utilization unit (61). This can reduce the constraints imposed by the placement conditions on how the utilization unit (61) is placed.

According to the twelfth and thirteenth aspects of the invention, the upper limit value of the degree of opening of the utilization-side expansion valve (51) in the heating operation is set for the utilization unit (61) except for the utilization unit (61) into which the refrigerant is relatively less likely to flow due to its placement conditions, so that the refrigerant becomes less likely to flow into the former utilization unit (61). In this manner, the refrigerant becomes more likely to flow into the utilization unit (61) into which the refrigerant is relatively less likely to flow due to its placement conditions.

This structure makes it possible to prevent the lack of the refrigerant in the utilization unit (61) into which the refrigerant is relatively less likely to flow due to its placement conditions, even when the height difference between the placement position of the utilization unit (61) placed at the lowest level and the placement position of the heat source unit (64) is relatively large. Therefore, the height difference between the placement position of the heat source unit (64) and the placement position of the utilization unit (61) can be increased as compared with the conventional refrigeration apparatus, which cannot adjust the ease of flow of the refrigerant into the utilization unit (61) into which the refrigerant is relatively less likely to flow due to its placement conditions.

Even when the height difference between the placement position of the utilization unit (61) and the placement position between the heat source unit (64) is not so large, or even when the utilization unit (61) and the heat source unit (64) are placed at the same level, and if one of the utilization units (61) is connected to the heat source unit (64) through a considerably long pipe as compared with the other utilization unit (61), the lack of the refrigerant can be avoided in the utilization unit (61) connected through the long pipe which relatively affects the ease of flow of the refrigerant. Therefore, the length of the pipe connecting the heat source unit (64) and the utilization unit (61) can be increased as compared with the conventional refrigeration apparatus which cannot adjust the ease of flow of the refrigerant into the utilization unit (61) connected through the long pipe.

Thus, the above-described structure can reduce the constraints imposed by the placement conditions on how the utilization unit (61) is placed.

BRIEF DESCRIPTION OF THE DRAWINGS

FIG. 4 is a flowchart illustrating a mechanism of the outdoor control section of the air conditioner according to Embodiment 1 during cooling operation.

FIG. 5 is a flowchart illustrating a mechanism of the outdoor control section and an indoor control section of the air conditioner according to Embodiment 1 during heating operation.

FIG. 6 is a schematic diagram illustrating an indoor control section of an air conditioner according to Embodiment 2.

DESCRIPTION OF CHARACTERS

10 Refrigerant circuit
11 Indoor circuit (utilization circuit)
14 Outdoor circuit (heat source circuit)
20 Air conditioner (refrigeration apparatus)
26 Compressor
36 Outdoor expansion valve (heat-source-side expansion valve)
38 Indoor control section (utilization-side valve opening control means)
41 Indoor heat exchanger (utilization-side heat exchanger)
44 Outdoor heat exchanger (heat-source-side heat exchanger)
51 Indoor expansion valve (utilization-side expansion valve)
52 Operating volume control section (operating volume control means)
53 Outdoor valve opening control section (heat-source-side valve opening control means)
54 Indoor command section (utilization-side valve opening control means)
58 Outdoor upper limit setting section (heat-source-side upper limit setting means)
59 Indoor upper limit setting section (utilization-side upper limit setting means)
61 Indoor unit (utilization unit)
64 Outdoor unit (heat source unit)

BEST MODE FOR CARRYING OUT THE INVENTION

Hereinafter, embodiments of the present invention will be described in detail with reference to the accompanying drawings.

[Embodiment 1]

Embodiment 1 of the present invention will be described below. Embodiment 1 is directed to an air conditioner (20) formed of a refrigeration apparatus of the present invention. This air conditioner (20) is configured to be able to select air cooling operation (cooling operation) and air heating operation (heating operation).

(Entire Structure of Air Conditioner)

Figure 1:
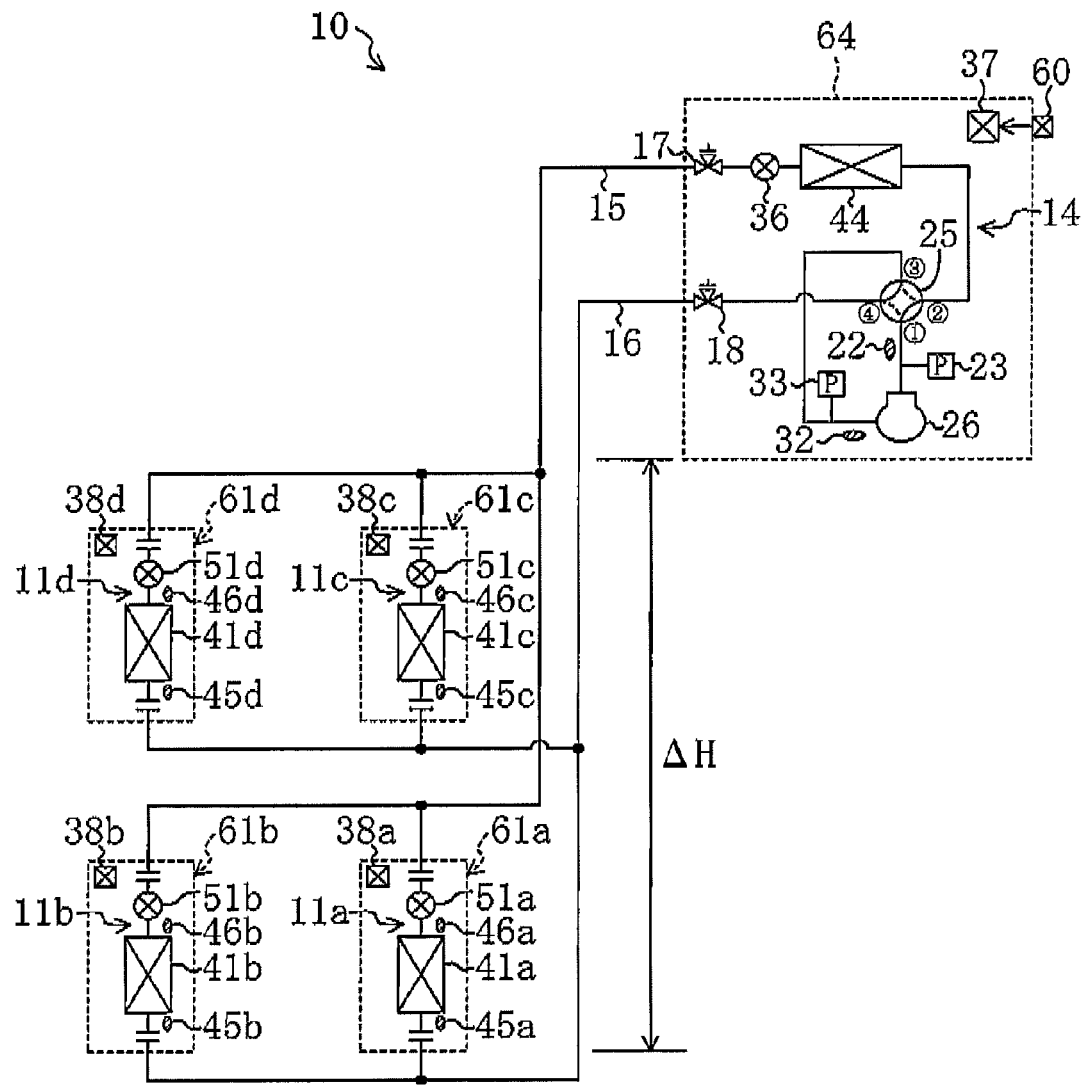
FIG. 1 is a schematic diagram of an air conditioner according to Embodiment 1.

As shown in FIG. 1, the air conditioner (20) of Embodiment 1 includes one outdoor unit (64), and four indoor units (61a, 61b, 61c, 61d). The outdoor unit (64) as a heat source unit is placed on a roof of a building. A first indoor unit (61a), a second indoor unit (61b), a third indoor unit (61c), and a fourth indoor unit (61d) are placed at levels lower than the outdoor unit (64). The first indoor unit (61a) and the second indoor unit (61b) are placed on the same floor, and the third indoor unit (61c) and the fourth indoor unit (61d) are placed on the same floor. The first indoor unit (61a) and the second indoor unit (61b) are placed on a floor lower than the third indoor unit (61c) and the fourth indoor unit (61d). The first indoor unit (61a) and the second indoor unit (61b) are utilization units placed at the lowest level. The number of the indoor unit (61) mentioned above is merely an example.

The air conditioner (20) includes a refrigerant circuit (10) filled with a refrigerant. The refrigerant circuit (10) is formed by connecting an outdoor circuit (14) included in the outdoor unit (64) to indoor circuits (11a, 11b, 11c, 11d) included in the indoor units (61a, 61b, 61c, 61d) through a liquid connecting pipe (15) and a gas connecting pipe (16). The outdoor circuit (14) constitutes a heat source circuit, and the indoor units (11) constitute utilization circuits, respectively.

Specifically, the indoor circuits (11) are connected in parallel to the outdoor circuit (14). One end of the liquid connecting pipe (15) is connected to a liquid stop valve (17) of the outdoor circuit (14), and the other end is branched into four to be connected to liquid ends of the indoor circuits (11), respectively. One end of the gas connecting pipe (16) is connected to a gas stop valve (18) of the outdoor circuit (14), and the other end is branched into four to be connected to gas ends of the indoor circuits (11), respectively. The refrigerant circuit (10) circulates the refrigerant therein to perform a vapor compression refrigeration cycle.

[Structure of Outdoor Circuit]

To the outdoor circuit (14), a compressor (26), an outdoor heat exchanger (44), an outdoor expansion valve (36), and a four way switching valve (25) are connected. The outdoor unit (64) includes an outdoor fan (not shown) for sending outdoor air to the outdoor heat exchanger (44).

The compressor (26) is configured as, for example, a dome-shaped, high-pressure hermetic scroll compressor. Power is fed to the compressor (26) through an inverter. The compressor (26) is configured to be able to vary an operating volume among multiple levels by changing an output frequency of an inverter to change the rotation speed of a motor. The compressor (26) is connected to a first port of the four way switching valve (25) at a discharge side, and is connected to a third port of the four way switching valve (25) at a suction side.

The outdoor heat exchanger (44) serving as a heat-source-side heat exchanger is configured as a cross-fin type, fin-and-tube heat exchanger. In the outdoor heat exchanger (44), outdoor air sent by the outdoor fan and the refrigerant exchange heat. One end of the outdoor heat exchanger (44) is connected to a second port of the four way switching valve (25), and the other end is connected to the liquid stop valve (17). A fourth port of the four way switching valve (25) is connected to the gas stop valve (18).

An outdoor expansion valve (36) serving as a heat-source-side expansion valve is provided between the liquid stop valve (17) and the outdoor heat exchanger (44). The outdoor expansion valve (36) is a motor-operated expansion valve having a valve body driven by a pulse motor. The outdoor expansion valve (36) is fully closed when a pulse number of 0 is input, and is fully opened when a pulse number of 500 is input.

The four way switching valve (25) is configured to be able to switch between a state (a first state indicated by a solid line in FIG. 1) in which the first port and the second port communicate with each other, and the third port and the fourth port communicate with each other, and a state (a second state indicated by a broken line in FIG. 1) in which the first port and the fourth port communicate with each other, and the second port and the third port communicate with each other.

A discharge pressure sensor (23) for detecting pressure of the refrigerant discharged from the compressor (26), and a discharge temperature sensor (22) for detecting temperature of the refrigerant discharged from the compressor (26) are provided between the discharge side of the compressor (26) and the first port of the four way switching valve (25). A suction pressure sensor (33) for detecting pressure of the refrigerant sucked into the compressor (26), and a suction temperature sensor (32) for detecting temperature of the refrigerant sucked into the compressor (26) are provided between the suction side of the compressor (26) and the third port of the four way switching valve (25).

[Structure of Indoor Circuit]

Each of the indoor circuits (11a, 11b, 11c, 11d) includes an indoor heat exchanger (41a, 41b, 41c, 41d), and an indoor expansion valve (51a, 51b, 51c, 51d) arranged in this order from the gas end. Each of the indoor units (61) is provided with an indoor fan (not shown) for sending indoor air to the indoor heat exchanger (41).

The indoor heat exchanger (41) serving as a utilization-side heat exchanger is configured as a cross-fin type, fin-and-tube heat exchanger. In the indoor heat exchanger (41), indoor air sent by the indoor fan and the refrigerant exchange heat. An indoor expansion valve (51) serving as a utilization-side expansion valve is a motor-operated expansion valve having a valve body driven by a pulse motor. The indoor expansion valve (51) is fully closed when a pulse number of 0 is input, and is fully opened when a pulse number of 500 is input.

Each of the indoor units (61) is provided with two temperature sensors for detecting the temperature of the refrigerant. A gas temperature sensor (45a, 45b, 45c, 45d) is arranged at the gas end of the indoor circuit (11) for detecting the temperature of the refrigerant flowing between the gas end of the indoor circuit (11) and the indoor heat exchanger (41). A liquid temperature sensor (46a, 46b, 46c, 46d) is arranged at the liquid end of the indoor circuit (11) for detecting the temperature of the refrigerant flowing between the indoor expansion valve (51) and the indoor heat exchanger (41).

[Structure of Control Section]

The air conditioner (20) of Embodiment 1 includes a height difference input section (60), an outdoor control section (37), and indoor control sections (38a, 38b, 38c, 38d). The height difference input section (60) and the outdoor control section (37) are provided in the outdoor unit (64). The indoor control sections (38) are provided in the indoor units (61), respectively. Each of the indoor control sections (38) is connected to the outdoor control section (37).

Figure 2:
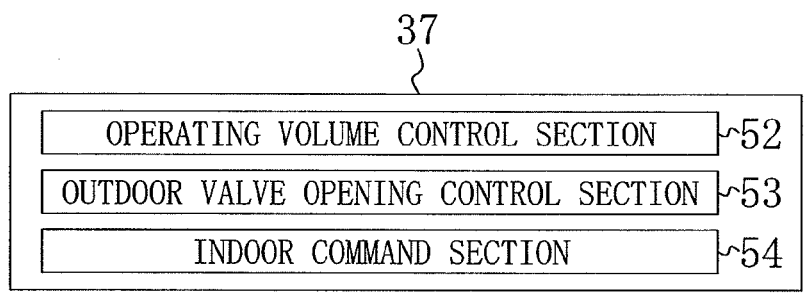
FIG. 2 is a schematic diagram of an outdoor control section of the air conditioner according to Embodiment 1.

The outdoor control section (37) includes, as shown in FIG. 2, an operating volume control section (52), an outdoor valve opening control section (53), and an indoor command section (54). The operating volume control section (52) is configured as an operating volume control means. The outdoor valve opening control section (53) is configured as a heat-source-side valve opening control means. The indoor command section (54) and the indoor control section (38) are configured as a utilization-side valve opening control means.

The height difference input section (60) is configured to be able to input a maximum height difference (ΔH), which is a height difference between the placement position of the outdoor unit (64) and the placement position of the indoor units (61a, 61b) placed on the lowest floor. The maximum height difference (ΔH) is, for example, input by a worker who installed the air conditioner (20). The height difference input section (60) outputs the input maximum height difference (ΔH) to the outdoor control section (37). In addition to the maximum height difference (ΔH), the outdoor control section (37) also receives values detected by the discharge pressure sensor (23), the suction pressure sensor (33), the discharge temperature sensor (22), and the suction temperature sensor (32).

The operating volume control section (52) is configured to control an operating volume of the compressor (26). Specifically, the operating volume control section (52) sets an initial value of a target low pressure value, which is a target value of the pressure of the refrigerant sucked into the compressor (26) in the air cooling operation, and sets an initial value of a target high pressure value, which is a target value of the pressure of the refrigerant discharged from the compressor (26) in the air heating operation. The operating volume control section (52) controls the operating volume of the compressor (26) so that the value detected by the suction pressure sensor (33) becomes equal to the target low pressure value in the air cooling operation, and that the value detected by the discharge pressure sensor (23) becomes equal to the target high pressure value in the air heating operation.

The outdoor valve opening control section (53) is configured to set a target loss value (L), which is a target value of a pressure loss of the refrigerant at the outdoor expansion valve (36) in the air cooling operation, based on the maximum height difference (ΔH). The outdoor valve opening control section (53) is configured to control the degree of opening of the outdoor expansion valve (36) so that the pressure loss of the refrigerant at the outdoor expansion valve (36) is kept to the target loss value (L) in the air cooling operation. The target loss value (L) is set, for example, by the following expression 1.

$$L=(\Delta H-X)\times\gamma \qquad \text{Expression 1}$$

In the expression 1, X indicates the height difference between the placement position of the outdoor unit (64) and the placement position of the indoor unit (61), with which the pressure of the refrigerant exerted on the indoor expansion valve (51) does not exceed a designed pressure or an upper limit pressure within a designed application range of the indoor expansion valve (51), even when the outdoor expansion valve (36) is always full open in the air cooling operation (e.g., X=50 m). The designed value or the upper limit pressure within a designed application range of the indoor expansion valve (51) is a predetermined reference pressure value. The target loss value (L) is set higher when the maximum height difference (ΔH) is larger. When the maximum height difference (ΔH) is smaller than X m, the target loss value L is set to 0. Symbol γ represents a density of the refrigerant of a single liquid phase.

The target loss value (L) is determined with reference to the state where the height difference between the placement position of the outdoor unit (64) and the placement position of the indoor unit (61) is X m. The target loss value (L) is equal to an increment of the liquid head pressure exerted on the indoor units (61a, 61b) on the lowest floor relative to the liquid head pressure when the above-described height difference is X m. Therefore, even when the height difference between the placement position of the outdoor unit (64) and the placement position of the indoor units (61a, 61b) on the lowest floor exceeds X m, the pressure of the refrigerant exerted on the indoor expansion valve (51a, 51b) is almost equal to the pressure of the refrigerant exerted on the indoor expansion valve (51) when the height difference is Xm, as long as the pressure loss of the refrigerant at the outdoor expansion valve (36) is kept to the target loss value (L) in the air cooling operation. Thus, the pressure of the refrigerant exerted on the indoor expansion valve (51a, 51b) is kept equal to or lower than the predetermined reference pressure value, i.e., the designed value or the upper limit pressure value within a designed application range of the indoor expansion valve (51a, 51b).

The indoor command section (54) is configured to perform low-quantity unit detecting operation and indoor command operation in the air heating operation. The low-quantity unit detecting operation is to find, among the four indoor units (61), a low-quantity indoor unit (61) in which a quantity of the refrigerant falls below a quantity required to deliver the air heating capacity. The low-quantity indoor unit (61) cannot deliver the air heating capacity required in response to the indoor temperature and the set temperature.

The indoor command section (54) receives information about the degree of opening of the indoor expansion valve (51) from the indoor control section (38) of each of the indoor units (61). The information about the degree of opening of the indoor expansion valve (51) is input every time the degree of opening of the indoor expansion valve (51) is varied in each of the indoor units (61). The indoor command section (54) monitors the degree of opening of the indoor expansion valve (51) of each of the indoor units (61) based on the information about the degree of opening of the indoor expansion valve (51). When the indoor unit (61) in which the indoor expansion valve (51) is fully opened is found (the degree of opening corresponds to a pulse of 500), the indoor unit (61) is judged as the low-quantity indoor unit (61). The indoor command section (54) may be configured to judge the indoor unit (61) in which the degree of the valve opening is equal to or higher than a predetermined value smaller than the degree of opening of the fully opened valve (e.g., a pulse of 450).

Upon finding the low-quantity indoor unit (61), the indoor command section (54) performs indoor command operation. In the indoor command operation, the indoor command section (54) sends a subcooling degree variation signal to the indoor units (61) except for the low-quantity indoor unit (61) to command them to vary a value of a target degree of subcooling to a larger value. When the low-quantity indoor unit (61) no longer exists, the indoor command section (54) sends a subcooling degree reset signal to the indoor units (61) to which the subcooling-degree variation signal has been sent to command them to reset the target degree of subcooling to an initial value. 4

The indoor control section (38) is configured to adjust the degree of opening of the indoor expansion valve (51). Specifically, the indoor control section (38) sets in advance an initial value of a target degree of superheating in the air cooling operation (e.g., 5° C.), and an initial value of a target degree of subcooling in the air heating operation (e.g., 5° C.). To the indoor control section (38), a value detected by the gas temperature sensor (45) and a value detected by the liquid temperature sensor (46) are input, and a value detected by the discharge pressure sensor (23) is also input from the outdoor unit (64). In the air cooling operation, the indoor control section (38) calculates the degree of superheating of the refrigerant discharged from the indoor heat exchanger (41) based on the detected values of the gas temperature sensor (45) and the liquid temperature sensor (46). Then, the indoor control section (38) adjusts the degree of opening of the indoor expansion valve (51) by, for example, PID control, so that the calculated degree of superheating approaches the target degree of superheating. In the air heating operation, the indoor control section (38) calculates the degree of subcooling of the refrigerant discharged from the indoor heat exchanger (41) based on the detected values of the discharge pressure sensor (23) and the liquid temperature sensor (46). Then, the indoor control section (38) adjusts the degree of opening of the indoor expansion valve (51) by, for example, PID control, so that the calculated degree of subcooling approaches the target degree of subcooling.

The indoor control section (38) is configured to perform subcooling degree variation operation when it receives the subcooling degree variation signal from the indoor command section (54). In the subcooling degree variation operation, the target degree of subcooling is varied to a value larger than the initial value (e.g., 8° C.). When the indoor control section (38) adjusts the degree of opening of the indoor expansion valve (51) so that the degree of subcooling, of the refrigerant discharged from the indoor heat exchanger (41) approaches the varied target degree of subcooling, the degree of opening of the indoor expansion valve (51) is gradually reduced. The indoor command operation of the indoor command section (54) and the subcooling degree variation operation of the indoor control section (38) constitute valve opening reducing operation. The indoor control section (38) is configured to perform operation of resetting the target degree of subcooling to the initial value when it receives the subcooling degree reset signal from the indoor command section (54).

Figure 3:
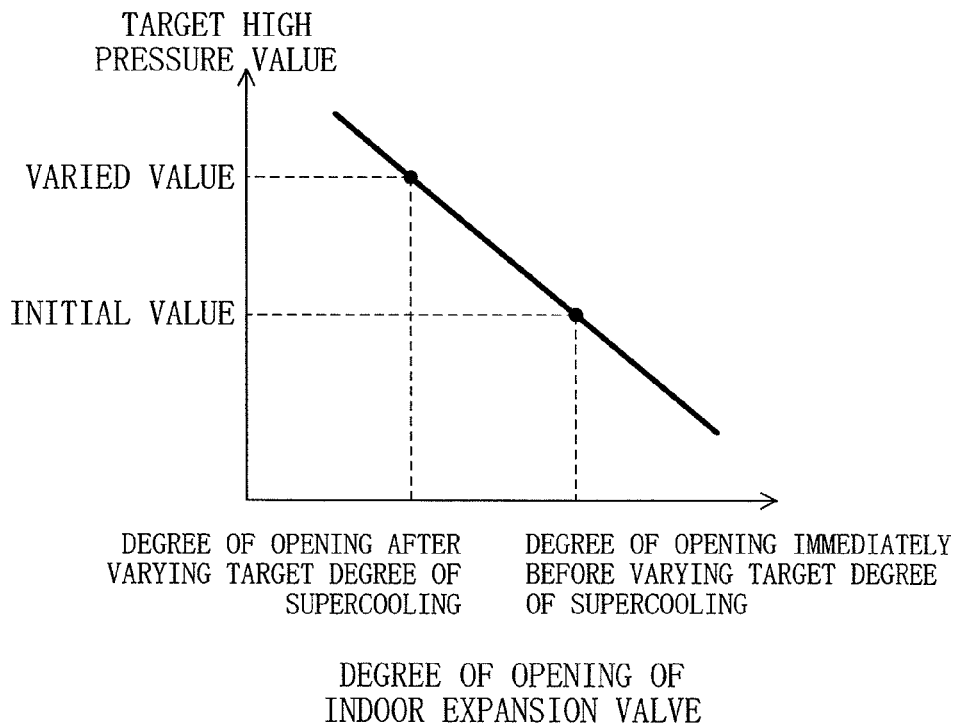
FIG. 3 is a graph illustrating relationship between the degree of opening of an indoor expansion valve of the air conditioner according to Embodiment 1 and a target high pressure value.

In the air conditioner (20), the operating volume control section (52) increases the operating volume of the compressor (26) in the valve opening reducing operation. Specifically, the indoor command section (54) sends the subcooling degree variation signal to the indoor units (61) except for the low-quantity indoor unit (61), and simultaneously, it sends a high pressure increase signal to the operating volume control section (52). Upon receiving the high pressure increase signal, the operating volume control section (52) receives the information about the degree of opening of the indoor expansion valve (51) from the indoor control section (38) of the indoor unit (61) in which the target degree of subcooling is varied. Then, the target high pressure value is varied, based on the expression obtained by mathematization of the graph of FIG. 3 illustrating relationship between the degree of opening of the indoor expansion valve (51) and the target high pressure value. According to the expression, based on the degree of opening of the indoor expansion valve (51) immediately before varying the target degree of subcooling, and the initial value of the target high pressure value, a varied target high pressure value is determined from the degree of opening of the indoor expansion valve (51) after varying the target degree of subcooling. In the indoor unit (61) in which the target degree of subcooling is varied, the degree of opening of the indoor expansion valve (51) is reduced. Therefore, the target high pressure value is varied to a larger value, and the operating volume of the compressor (26) increases. If the target degree of subcooling is varied in two or more indoor units (61), an average value of the degree of opening of the indoor expansion valve (51) is used in the expression.

If the height difference between the placement position of the first indoor unit (61a) and the second indoor unit (61b) on the lowest floor and the placement position of the heat source unit (64) is relatively large, the liquid head pressure exerted on an outlet of the first indoor unit (61a) and an outlet of the second indoor unit (61b) increases, and the difference between pressure at the inlet and pressure at the outlet decreases in the first indoor unit (61a) and the second indoor unit (61b). In this case, the refrigerant is less likely to flow into the first indoor unit (61a) and the second indoor unit (61b), and the quantity of the refrigerant in them may fall below the quantity required to deliver their air heating capacity. That is, the first indoor unit (61a) and the second indoor unit (61b) may possibly become the low-quantity indoor units.

For example, when both of the first indoor unit (61a) and the second indoor unit (61b) are judged as the low-quantity indoor units (61*a*, 61*b*), the valve opening reducing operation is performed to reduce the degree of opening of the indoor expansion valve (51) in each of the third indoor unit (61*c*) and the fourth indoor unit (61*d*). As a result, the refrigerant becomes less likely to flow into the third indoor unit (61*c*) and the fourth indoor unit (61*d*), and therefore, the refrigerant is more likely to flow into the first indoor unit (61*a*) and the second indoor unit (61*b*).

When one of the first indoor unit (61*a*) and the second indoor unit (61*b*), e.g., the first indoor unit (61*a*), is judged as the low-quantity indoor unit (61*a*, 61*b*), the valve opening reducing operation is performed to reduce the degree of opening of the indoor expansion valve (51) in each of the second indoor unit (61*b*), the third indoor unit (61*c*), and the fourth indoor unit (61*d*). As a result, the refrigerant becomes less likely to flow into the second indoor unit (61*b*), the third indoor unit (61*c*) and the fourth indoor unit (61*d*), and therefore, the refrigerant is more likely to flow into the first indoor unit (61*a*).

In this case, the second indoor unit (61*b*) is likely to fall short of the quantity of the refrigerant, even if it is not judged as the low-quantity indoor unit. Therefore, the valve opening reducing operation may be performed so as not to reduce the degree of opening of the indoor expansion valve (51) of the second indoor unit (61*b*). In this valve opening reducing operation, the indoor command section (54) sends the sub-cooling degree variation signal only to the third indoor unit (61*c*) and the fourth indoor unit (61*d*).

—Operation Mechanism—

An operation mechanism of the air conditioner (20) of Embodiment 1 will be described below. In the air conditioner (20), the four way switching valve (25) implements the switching between the air cooling operation and the air heating operation.

[Air Cooling Operation]

In the air cooling operation, the four way switching valve (25) is set to the first state indicated by the solid line in FIG. 1. When the compressor (26) is driven in this state, the refrigerant circuit (10) performs a refrigeration cycle in which the outdoor heat exchanger (44) functions as a condenser, and the indoor heat exchangers (41*a*, 41*b*) function as evaporators.

Specifically, when the compressor (26) is driven, the refrigerant discharged from the compressor (26) flows into the outdoor heat exchanger (44), and dissipates heat into outdoor air to condense. The refrigerant condensed in the outdoor heat exchanger (44) is reduced in pressure by the outdoor expansion valve (36), and is distributed to the indoor circuits (11*a*, 11*b*), respectively. The flows of the refrigerant into the indoor circuits (11*a*, 11*b*) are reduced in pressure by the indoor expansion valves (51*a*, 51*b*), and enter the indoor heat exchangers (41*a*, 41*b*), respectively. In the indoor heat exchangers (41*a*, 41*b*), the flows of the refrigerant absorb heat from the indoor air to evaporate. At this time, the indoor air cooled by the flows of the refrigerant is supplied to the room. The flows of the refrigerant evaporated in the indoor heat exchangers (41*a*, 41*b*) are joined together in the gas connecting pipe (16), and the joined refrigerant flow enters the outdoor circuit (14), is sucked into the compressor (26), and is discharged again.

In the air conditioner (20) of Embodiment 1, the outdoor valve opening control section (53) checks the pressure loss of the refrigerant at the outdoor expansion valve (36) every certain period in the air cooling operation. When the pressure loss of the refrigerant at the outdoor expansion valve (36) is not equal to the target loss value (L), the outdoor valve opening control section (53) adjusts the degree of opening of the outdoor expansion valve (36) so that the pressure loss of the refrigerant at the outdoor expansion valve (36) becomes equal to the target loss value (L).

Specifically, the outdoor valve opening control section (53) calculates the quantity of the refrigerant circulating in the refrigerant circuit (10) in step 1 (ST1) as shown in FIG. 4. The quantity of the refrigerant circulating in the refrigerant circuit (10) can be calculated, for example, by dividing power input to the compressor (26) per unit time by the difference between enthalpy of the discharged refrigerant calculated from the values of the discharge pressure sensor (23) and the discharge temperature sensor (22) and enthalpy of the sucked refrigerant calculated from the values of the suction pressure sensor (33) and the suction temperature sensor (32).

Then, the outdoor valve opening control section (53) calculates, in step 2 (ST2), the pressure loss of the refrigerant at the outdoor expansion valve (36) at that time, using the quantity of the refrigerant circulating in the refrigerant circuit (10) calculated in step 1 (ST1), and the degree of opening of the outdoor expansion valve (36) at that time. The pressure loss of the refrigerant is larger as the quantity of the refrigerant circulating in the refrigerant circuit (10) is larger, and is smaller as the degree of opening of the outdoor expansion valve (36) is smaller.

The outdoor valve opening control section (53) compares, in step 3 (ST3), the target loss value (L) calculated by the expression 1 and the pressure loss calculated in step 2 (ST2). When the pressure loss of the refrigerant calculated in step 2 (ST2) is larger than the target loss value (L) in step 4 (ST4), the outdoor valve opening control section (53) reduces the degree of opening of the outdoor expansion valve (36) so that the pressure loss of the refrigerant at the outdoor expansion valve (36) becomes equal to the target loss value (L). When the pressure loss of the refrigerant calculated in step 2 (ST2) is smaller than the target loss value (L), the outdoor valve opening control section (53) increases the degree of opening of the outdoor expansion valve (36) so that the pressure loss of the refrigerant at the outdoor expansion valve (36) becomes equal to the target loss value (L).

In the air conditioner (20), when the degree of opening of the outdoor expansion valve (36) is varied, the degree of opening of the indoor expansion valve (51) is adjusted so that the degree of superheating of the refrigerant at the outlet of the indoor circuit (11) is kept constant. Therefore, the quantity of the refrigerant in the refrigerant circuit (10) is not greatly varied. For example, when the degree of opening of the outdoor expansion valve (36) is reduced, the quantity of the refrigerant in the refrigerant circuit (10) is temporarily reduced, thereby increasing the degree of superheating of the refrigerant at the outlet of the indoor circuit (11). When the degree of superheating of the refrigerant at the outlet of the indoor circuit (11) increases, the degree of opening of the indoor expansion valve (51) increases. This increases the quantity of the refrigerant in the refrigerant circuit (10). Thus, the quantity of the refrigerant in the refrigerant circuit (10) is not greatly varied as compared with the quantity before changing the degree of opening of the outdoor expansion valve (36).

[Air Heating Operation]

In the air heating operation, the four way switching valve (25) is set to the second state indicated by the broken line in FIG. 1. When the compressor (26) is driven in this state, the refrigerant circuit (10) performs a refrigeration cycle in which the indoor heat exchangers (41*a*, 41*b*) function as condensers, and the outdoor heat exchanger (44) functions as an evaporator.

Specifically, when the compressor (26) is driven, the refrigerant discharged from the compressor (26) flows into the indoor heat exchangers (41a, 41b), and dissipates heat into the indoor air to condense. At this time, the indoor air heated by the refrigerant is supplied to the room. The flows of the refrigerant condensed in the indoor heat exchangers (41a, 41b) are joined together in the liquid connecting pipe (15), and the joined refrigerant flow enters the outdoor circuit (14). The refrigerant flowed into the outdoor circuit (14) is reduced in pressure by the outdoor expansion valve (36), and then flows into the outdoor heat exchanger (44). In the outdoor heat exchanger (44), the flowed refrigerant absorbs heat from the outdoor air to evaporate. The refrigerant evaporated in the outdoor heat exchanger (44) is sucked into the compressor (26), and is discharged again.

In the air conditioner (20) of Embodiment 1, when the low-quantity indoor unit (61) is detected in the air heating operation, the degree of opening of the utilization-side expansion valve (51) of each of the indoor units (61) except for the low-quantity indoor unit (61) decreases, and simultaneously, the operating volume of the compressor (26) increases.

Specifically, the indoor command section (54) performs the low-quantity unit detecting operation in step 1 (ST1) shown in FIG. 5. The low-quantity unit detecting operation is performed every time when the indoor control section (38) of each of the indoor units (61) inputs the information about the degree of opening of the indoor expansion valve (51). In the low-quantity unit detecting operation, the indoor command section (54) checks whether the low-quantity indoor unit (61) in which the indoor expansion valve (51) is fully opened exists or not based on the input information about the degree of opening of the indoor expansion valve (51). When the low-quantity indoor unit (61) is found, the indoor command section (54) sends a subcooling degree variation signal to the indoor units (61) except for the low-quantity indoor unit (61) in step 2 (ST2), and sends a high pressure increase signal to the operating volume control section (52).

Upon receiving the subcooling degree variation signal, the indoor control section (38) performs subcooling degree variation operation in step 3 (ST3). In the subcooling degree variation operation, the indoor control section (38) varies the target degree of subcooling to a higher value (e.g., 8° C.). When the indoor control section (38) adjusts the degree of opening of the indoor expansion valve (51) after the target degree of subcooling is varied, the degree of opening of the indoor expansion valve (51) becomes smaller than the degree of opening before varying the target degree of subcooling. That is, the subcooling degree variation operation reduces the degree of opening of the indoor expansion valve (51) of each of the indoor units (61) except for the low-quantity indoor unit (61).

The operating volume control section (52) which received the high pressure increase signal varies the target high pressure value in step 4 (ST4). The target high pressure value is varied based on the expression obtained by mathematization of the graph of FIG. 3. In the indoor unit (61) with the target degree of subcooling varied, the degree of opening of the indoor expansion valve (51) becomes smaller than the degree of opening before varying the target degree of the subcooling. As a result, the target high pressure value becomes larger than the target high pressure value before receiving the high pressure increase signal. Thus, when the operating volume control section (52) adjusts the operating volume of the compressor (26) based on the varied target high pressure value, the operating volume of the compressor (26) increases.

As a result, the quantity of the refrigerant circulating in the refrigerant circuit (10) increases, and the quantity of the refrigerant distributed to each of the indoor units (61) increases. Therefore, the quantity of the refrigerant is less likely to decrease in the indoor unit (61) in which the degree of opening of the indoor expansion valve (51) is reduced by the subcooling degree variation signal, and the quantity of the refrigerant is maintained in the low-quantity indoor unit (61).

—Advantages of Embodiment 1

According to Embodiment 1, the degree of opening of the outdoor expansion valve (36) is adjusted to adjust the pressure exerted on the indoor expansion valve (51), so that the air conditioner can cope with the state where the pressure exerted on the indoor expansion valve (51) increases in the air cooling operation when the height difference between the placement position of the outdoor unit (64) and the placement position of the indoor unit (61) is large. This structure makes it possible to increase the liquid head pressure as compared with a conventional refrigeration apparatus which cannot adjust the pressure exerted on the indoor expansion valve (51) in response to the height difference. Therefore, the height difference between the placement position of the outdoor unit (64) and the placement position of the indoor unit (61) can be increased as compared with the conventional refrigeration apparatus.

In Embodiment 1, the magnitude of the liquid head pressure exerted on the liquid end of the indoor circuit (11) of the indoor unit (61) placed on the lowest floor in the air cooling operation is judged from the maximum height difference, and the target loss value for controlling the degree of opening of the outdoor expansion valve (36) in the air cooling operation is set based on the magnitude of the liquid head pressure. Specifically, a judgment is made from the maximum height difference as to whether or not the pressure of the refrigerant flowing through the indoor expansion valve (51) of the indoor unit (61) on the lowest floor will be as high as it may break the indoor expansion valve (51). Therefore, even if the indoor unit (61) is not provided with a pressure sensor for detecting the pressure of the refrigerant flowing through the indoor expansion valve (51) of the indoor unit (61), the pressure of the refrigerant exerted on the indoor expansion valve (51) can be kept equal to or lower than the predetermined reference pressure value. Thus, the structure of the air conditioner (20) can be simplified.

In Embodiment 1, for protecting the indoor expansion valve (51), the pressure loss of the refrigerant at the outdoor expansion valve (36) is kept to the target loss value, so that the pressure loss of the refrigerant at the outdoor expansion valve (36) is not increased more than required. This makes it possible to protect the indoor expansion valve (51) with reliability, and to prevent waste of the capacity and efficiency of the air conditioner (20) in the air cooling operation.

In Embodiment 1, the valve opening reducing operation is performed when the low-quantity indoor unit (61) is found among the plurality of the indoor units (61) in the air heating operation. As a result, the refrigerant is less likely to flow into the indoor units (61) for which the valve opening reducing operation is performed, and the refrigerant is more likely to flow into the low-quantity indoor unit (61). Therefore, even when the height difference between the placement position of the indoor unit (61) placed on the lowest floor and the placement position of the heat source unit (64) is relatively large, the lack of the refrigerant can be avoided in the indoor unit (61) on the lowest floor, which may possibly become the low-quantity indoor unit. Thus, the height difference between the placement position of the outdoor unit (64) and the placement position of the indoor unit (61) can be enlarged as compared with a conventional refrigeration apparatus which cannot adjust ease of flow of the refrigerant into the indoor unit (61) on the lowest floor.

In Embodiment 1, in the heating operation, the operating volume of the compressor (26) increases when the valve opening reducing operation is performed, so as to prevent the reduction in refrigerant quantity in the indoor unit (61) for which the valve opening reducing operation is performed, and to maintain the refrigerant quantity in the low-quantity indoor unit (61). This can facilitate keeping a sufficient quantity of the refrigerant in each of the indoor units (61), and facilitate delivering a sufficient capacity of each of the indoor units (61).

—Modified Example of Embodiment 1—

A modified example of Embodiment 1 will be described below. In this modified example, the outdoor valve opening control section (53) is configured to adjust the degree of opening of the outdoor expansion valve (36), while it monitors the pressure of the refrigerant at the outlet of the outdoor unit (64) in the air cooling operation. Though not shown, a liquid pressure sensor is provided between the liquid stop valve (17) and the outdoor expansion valve (36) for detecting the pressure of the liquid refrigerant flowing therebetween.

Specifically, the outdoor valve opening control section (53) sets a target pressure value (P), which is a target pressure value of the refrigerant at the outlet of the outdoor unit (64). The target pressure value (P) may be set, for example, by the following expression 3.

$$P = A - \Delta H \times \gamma \qquad \text{Expression 3}$$

In Expression 3, A represents a value slightly smaller than a designed pressure or an upper limit value within a designed application range of the indoor expansion valve (51). The outdoor valve opening control section (53) regards the value detected by the liquid pressure sensor as the pressure of the refrigerant at the outlet of the outdoor unit (64), and compares the detected value of the liquid pressure sensor with the target pressure value (P). When the detected value of the liquid pressure sensor is larger than the target pressure value (P), the degree of opening of the outdoor expansion valve (36) is reduced so that the detected value of the liquid pressure sensor becomes equal to the target pressure value (P). When the detected value of the liquid pressure sensor is smaller than the target pressure value (P), the degree of opening of the outdoor expansion valve (36) increases so that the detected value of the liquid pressure sensor becomes equal to the target pressure value (P).

When the maximum height difference ($\Delta H$) is large, a temperature sensor is provided instead of the liquid pressure sensor, so as to detect the pressure of the refrigerant at the outlet of the outdoor unit (64) in the air heating operation from the value detected by the temperature sensor. When the maximum height difference ($\Delta H$) is large, the degree of opening of the outdoor expansion valve (36) in the air cooling operation becomes relatively small, and the refrigerant passed through the outdoor expansion valve (36) is reduced in pressure until the refrigerant is converted from the subcooling state to a gas-liquid two phase. Therefore, the pressure of the refrigerant can be detected from the temperature of the refrigerant.

[Embodiment 2]

Embodiment 2 of the present invention will be described below. In an air conditioner (20) of Embodiment 2, as shown in FIG. 6, the outdoor control section (37) includes an outdoor upper limit setting section (58) instead of the outdoor valve opening control section (53), and an indoor upper limit setting section (59) instead of the indoor command section (54). The outdoor upper limit setting section (58) constitutes a heat-source-side upper limit setting means. The indoor upper limit setting section (59) constitutes a utilization-side upper limit setting means.

Specifically, the outdoor upper limit setting section (58) is configured to set an upper limit value of the degree of opening of the outdoor expansion valve (36) in the air cooling operation based on the maximum height difference ($\Delta H$), which is the height difference between the placement position of the outdoor unit (64) and the placement position of the first and second indoor units (61a, 61b) on the lowest floor. The upper limit value of the degree of opening of the outdoor expansion valve (36) is a value smaller than the degree of opening of the fully opened valve. For example, the upper limit value is set smaller when the maximum height difference ($\Delta H$) is larger, so that the pressure exerted on the indoor expansion valves (51a, 51b) of the first and second indoor units (61a, 61b) does not exceed the designed pressure or the upper limit pressure within the designed application range, even when the operating volume of the compressor (26) is the maximum.

For example, when the maximum height difference ($\Delta H$) is 70 m, the outdoor upper limit setting section (58) sets the upper limit value of the degree of opening of the outdoor expansion valve (36) to a pulse of 400. When the maximum height difference ($\Delta H$) is 90 m, the upper limit value of the degree of opening of the outdoor expansion valve (36) is set to a pulse of 300. With the upper limit value thus set, the degree of opening of the outdoor expansion valve (36) in the air cooling operation is controlled within a range not exceeding the upper limit value.

When the maximum height difference between the outdoor unit (64) and the indoor unit (61) is relatively large, the indoor upper limit setting section (59) is configured to set the upper limit value of the degree of opening of the indoor expansion valve (51) in the heating operation for the indoor units (61) except for the indoor unit (61) into which the refrigerant is relatively less likely to flow due to its placement conditions.

Specifically, the indoor upper limit setting section (59), when the plurality of indoor units (61) are placed at different levels as shown in FIG. 1, the indoor unit (61) on the lowest floor is regarded as the indoor unit into which the refrigerant is relatively less likely to flow due to its placement conditions. When the plurality of indoor units (61) are placed at the same level, at least one of the indoor units (61) connected to the outdoor unit (64) through a long pipe is regarded as the indoor unit into which the refrigerant is relatively less likely to flow due to its placement conditions.

The indoor upper limit setting section (59) sets the upper limit value of the degree of opening of the indoor expansion valve (51) in the heating operation in each of the indoor units (61) except for the indoor unit (61) into which the refrigerant is relatively less likely to flow due to its placement conditions, for example, based on the maximum height difference. The upper limit value is smaller than the degree of opening of the fully opened valve.

For example, when the maximum height difference ($\Delta H$) is 70 m, the indoor upper limit setting section (59) sets the upper limit of the degree of opening to a pulse of 400. When the maximum height difference ($\Delta H$) is 90 m, the upper limit of the degree of opening is set to a pulse of 300. With the upper limit value thus set, the degree of opening of the indoor expansion valve (51) in the heating operation is controlled within a range not exceeding the upper limit value.

—Advantages of Embodiment 2—

In Embodiment 2, the upper limit value of the degree of opening of the outdoor expansion valve (36) is set in response to the magnitude of the liquid head pressure exerted on the indoor expansion valve (51) of the indoor unit (61) on the lowest floor. In a conventional air conditioner which cannot set the upper limit value of the degree of opening of the outdoor expansion valve (36) in response to the liquid head pressure, for example, the upper limit value of the height difference between the placement position of the outdoor unit (64) and the placement position of the indoor unit (61) is determined so as to prevent excessive increase of the pressure of the refrigerant flowing into the indoor expansion valve (51), and to avoid break of the indoor expansion valve (51), even when the outdoor expansion valve (36) is fully opened in the air cooling operation. In Embodiment 2, on the other hand, the upper limit value of the height difference between the placement position of the outdoor unit (64) and the placement position of the indoor unit (61) is determined so as to cope with the state where the degree of the opening of the outdoor expansion valve (36) reaches the upper limit value in the air cooling operation, i.e., the state where the pressure loss of the refrigerant at the outdoor expansion valve (36) is greater than that in the conventional case. As compared with the conventional case, this makes it possible to increase the liquid head pressure, and allows for the increase of the height difference between the placement position of the outdoor unit (64) and the placement position of the indoor unit (61).

In Embodiment 2, when there is a relatively large height difference between the placement position of the indoor unit (61) on the lowest floor and the placement position of the outdoor unit (64), an upper limit value of the degree of opening of the indoor expansion valve (51) in the heating operation is set for the indoor units (61) except for the indoor unit (61) into which the refrigerant is relatively less likely to flow due to its placement conditions. Therefore, the refrigerant is less likely to flow into the indoor units (61) for which the upper limit value is set, and the refrigerant is more likely to flow into the indoor unit (61) into which the refrigerant is relatively less likely to flow due to its placement conditions. Therefore, the lack of the refrigerant in the indoor unit (61) on the lowest floor can be avoided even when the height difference between the placement position of the indoor unit (61) on the lowest floor and the placement position of the outdoor unit (64) is relatively large. Thus, the height difference between the placement position of the outdoor unit (64) and the placement position of the indoor unit (61) can be enlarged as compared with the conventional refrigeration apparatus which cannot adjust the ease of the refrigerant flow into the indoor unit (61) on the lowest floor.

[Other Embodiments]

The above-described embodiments may be modified as described below.

In the above-described embodiments, the air conditioner (20) is configured so that the maximum height difference (ΔH), which is the height difference between the placement position of the outdoor unit (64) and the placement position of the indoor unit (61) on the lowest floor, is input by a worker or the like. However, the air conditioner (20) may be configured to be able to automatically recognize the maximum height difference (ΔH).

In the above-described embodiments, a plurality of the outdoor units (64) may be provided. In the air conditioner (20) of Embodiment 1, the degree of opening of the outdoor expansion valve (36) of each of the outdoor units (64) in the air cooling operation is controlled so that the pressure loss of the refrigerant at the outdoor expansion valve (36) is kept to the target loss value (L). In the air conditioner (20) of Embodiment 2, an upper limit value of the degree of opening of the outdoor expansion valve (36) in the air cooling operation is set based on the maximum height difference (ΔH).

In Embodiment 1, the indoor command section (54) may judge whether or not the indoor unit (61) is the low-quantity indoor unit, based on the degree of subcooling of the refrigerant discharged from the indoor unit (61), in addition to the information about the degree of opening of the indoor expansion valve (51). For example, even when the degree of opening of the indoor expansion valve (51) is equal to or higher than the predetermined value, the indoor command section (54) does not judge each of the indoor units (61) as the low-quantity indoor unit as long as the degree of subcooling is equal to or higher than the target degree of subcooling. When the indoor unit is found in which the degree of opening of the indoor expansion valve (51) is equal to or higher than the predetermined value, and the degree of subcooling is below the target degree of subcooling, the indoor unit is recognized as the low-quantity indoor unit.

The above embodiments are simply described as preferred embodiments in nature, and are not intended to limit the scope, applications and use of the invention.

INDUSTRIAL APPLICABILITY

As described above, the present invention is useful for a refrigeration apparatus including a heat source unit and a utilization unit.

The invention claimed is:

1. A refrigeration apparatus comprising:
   a heat source unit having a heat source circuit connecting a compressor, a heat-source-side heat exchanger, and a heat-source-side expansion valve; and
   a utilization unit having a utilization circuit connecting a utilization-side heat exchanger and a utilization-side expansion valve, and being placed at a level lower than the heat source unit,
   the heat source circuit and the utilization circuit being connected to provide a refrigerant circuit for performing cooling operation by circulating a refrigerant so that the heat-source-side heat exchanger functions as a condenser, and the utilization-side heat exchanger functions as an evaporator, wherein
   the heat-source-side expansion valve and the utilization-side expansion valve in the refrigerant circuit are connected through a liquid connecting pipe,
   a heat-source-side valve opening controller is provided for controlling a degree of opening of the heat-source-side expansion valve so that pressure of the refrigerant flowing into the utilization-side expansion valve in the cooling operation becomes equal to or lower than a predetermined reference pressure value, and
   the heat-source-side valve opening controller controls the degree of opening of the heat-source-side expansion valve in the cooling operation so that the pressure of the refrigerant flowing into the utilization-side expansion valve becomes equal to or lower than the predetermined reference pressure value, using a target control value for the cooling operation determined based on a height difference between a placement position of the heat source unit and a placement position of the utilization unit.

2. The refrigeration apparatus of claim 1, wherein
   the heat-source-side valve opening controller controls the degree of opening of the heat-source-side expansion valve in the cooling operation so that pressure loss of the refrigerant at the heat-source-side expansion valve is kept to a target loss value determined as a target control value of the pressure loss in the cooling operation.

3. The refrigeration apparatus of claim 1, wherein
multiple ones of the utilization unit are provided, and are connected in parallel to the heat source unit, and
the target control value for the cooling operation is determined based on a height difference between the placement position of the heat source unit and a placement position of one of the utilization units placed at the lowest level.

4. The refrigeration apparatus of claim 3, wherein
the refrigeration apparatus is configured to selectively perform the cooling operation and heating operation of circulating the refrigerant so that the heat-source-side heat exchanger functions as an evaporator, and the utilization-side heat exchangers function as condensers in the refrigerant circuit, and
a utilization-side valve opening controller is provided for performing, when a low-quantity utilization unit in which a quantity of the refrigerant falls below a quantity of the refrigerant required for delivering capacity of the utilization unit is found among the multiple ones of the utilization unit in the heating operation, valve opening reducing operation of reducing a degree of opening of the utilization-side expansion valve of one or more of the utilization units except for the low-quantity utilization unit.

5. The refrigeration apparatus of claim 4, wherein
the utilization-side valve opening controller in the heating operation judges the utilization unit in which the degree of opening of the utilization-side expansion valve is equal to or higher than a predetermined value as the low-quantity utilization unit.

6. The refrigeration apparatus of claim 4, further comprising:
an operating volume controller for increasing an operating volume of the compressor when the utilization-side valve opening controller performs the valve opening reducing operation in the heating operation.

7. The refrigeration apparatus of claim 4, wherein
in the heating operation, the utilization-side valve opening controller controls the degree of opening of the utilization-side expansion valve of each of the utilization units so that a degree of subcooling of the refrigerant discharged from each of the utilization-side heat exchangers becomes equal to a target degree of subcooling, and the utilization-side valve opening controller varies the target degree of subcooling of the utilization unit for which the valve opening reducing operation is performed to a larger value in the valve opening reducing operation.

8. A refrigeration apparatus comprising:
a heat source unit having a heat source circuit connecting a compressor, a heat-source-side heat exchanger, and a heat-source-side expansion valve; and
a utilization unit having a utilization circuit connecting a utilization-side heat exchanger and a utilization-side expansion valve, and being placed at a level lower than the heat source unit,
the heat source circuit and the utilization circuit being connected to provide a refrigerant circuit for performing cooling operation by circulating a refrigerant so that the heat-source-side heat exchanger functions as a condenser, and the utilization-side heat exchanger functions as an evaporator, wherein
the heat-source-side expansion valve and the utilization-side expansion valve in the refrigerant circuit are connected through a liquid connecting pipe, and
a heat-source-side upper limit setting device is provided for setting an upper limit value of a degree of opening of the heat-source-side expansion valve in the cooling operation based on a height difference between a placement position of the heat source unit and a placement position of the utilization unit.

9. The refrigeration apparatus of claim 8, wherein
multiple ones of the utilization unit are provided, and are connected in parallel to the heat source unit, and
the heat-source-side upper limit setting device sets an upper limit value of the degree of opening of the heat-source-side expansion valve in the cooling operation based on a height difference between the placement position of the heat source unit and a placement position of one of the utilization units placed at the lowest level.

10. The refrigeration apparatus of claim 9, wherein
the refrigeration apparatus is configured to selectively perform the cooling operation and heating operation of circulating the refrigerant so that the heat-source-side heat exchanger functions as an evaporator, and the utilization-side heat exchangers function as condensers in the refrigerant circuit, and
a utilization-side upper limit setting device is provided for setting an upper limit value of the degree of opening of the utilization-side expansion valve in the heating operation for one or more of the utilization units except for the utilization unit into which the refrigerant is relatively less likely to flow due to its placement conditions.

* * * * *